Jan. 15, 1957

A. LATHAM, JR 2,777,814

WATER HEATING AND DEMINERALIZING APPARATUS

Filed Dec. 2, 1954

INVENTOR.
ALLEN LATHAM, JR.
BY
HIS ATTORNEY

United States Patent Office 2,777,814
Patented Jan. 15, 1957

2,777,814

WATER HEATING AND DEMINERALIZING APPARATUS

Allen Latham, Jr., Jamaica Plain, Mass., assignor, by mesne assignments, to General Electric Company, Schenectady, N. Y., a corporation of New York Application December 2, 1954, Serial No. 472,596

1 Claim. (Cl. 204—301)

This invention relates to water treating apparatus and more particularly to a water heating and demineralizing system adapted to produce demineralized hot water for household use.

The advantages of demineralized or soft water over hard water for general household use and particularly for washing purposes has long been recognized. However the chemical treatment systems heretofore developed for softening the hard waters found in many geographical areas have several disadvantages which have considerably limited the installation and use of such systems in homes and the like. Among these disadvantages are the relatively large tanks required to contain the necessary chemical supplies, the necessity of replenishing these supplies from time to time, and the fact that such apparatus generally requires the frequent attention of the user.

A principal object of the present invention is to provide improved water heating and demineralizing apparatus which is similar in size to a domestic water heater, automatic in operation and which will operate for long periods of time without attention of the user.

Further objects and advantages of my invention will become apparent as the following description proceeds, and the features of novelty which characterize the invention will be pointed out with particularity in the claim annexed to and forming a part of this specification.

Briefly stated, in a preferred embodiment of my invention I provide an electrodialysis cell capable of separating dissolved mineral ions from water, a heating chamber, and a water storage tank interconnected and arranged so that cold water from the tank circulates through the cell and the heating chamber before returning to the upper portion of the tank, the energization of the cell and the heating means being controlled in accordance with the temperature of water in the tank.

For a better understanding of my invention, reference may be made to the accompanying drawing in which.

Figure 1:
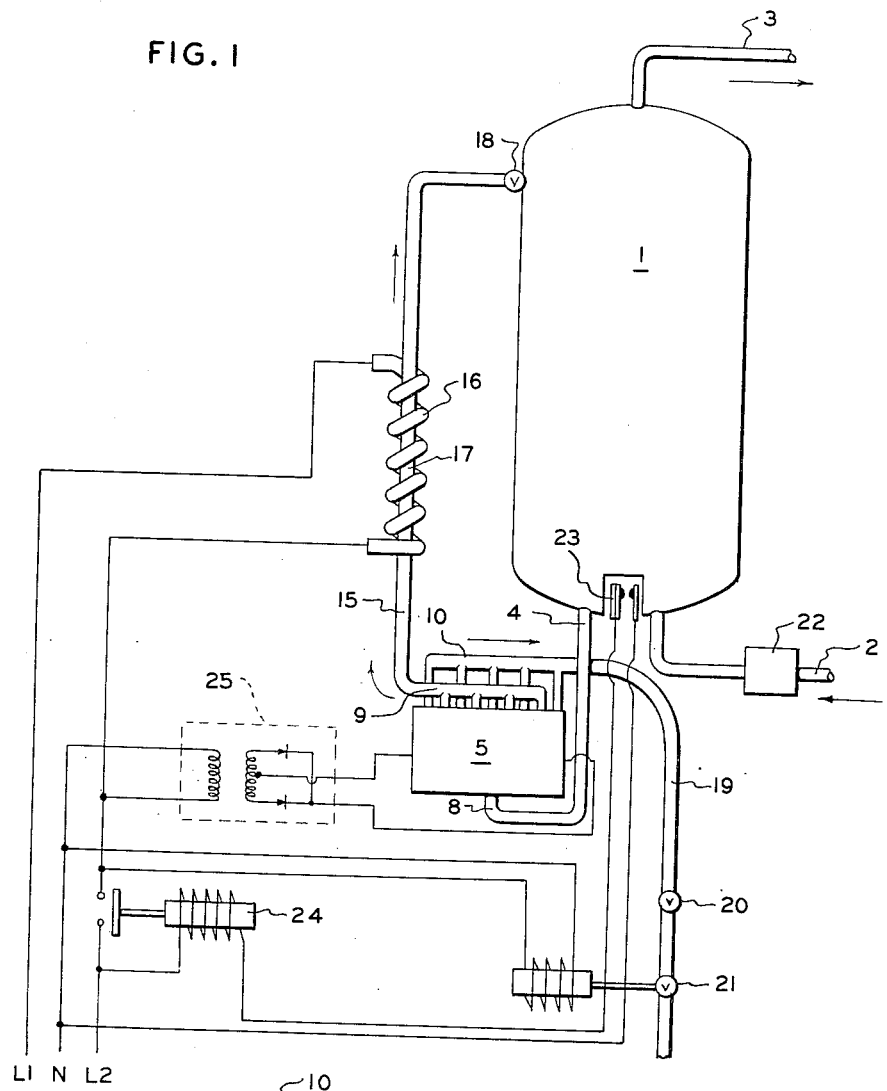
Fig. 1 is a diagrammatic view of the water treating system of my invention.

Referring to the drawing, the numeral 1 designates a water tank having an inlet pipe 2 and an outlet pipe 3. Inlet pipe 2 is of course adapted to be connected to a suitable water supply system while outlet pipe 3 may lead to any desired points of distribution for the hot water. Also connected to the bottom of tank 1 is a conduit 4 connected to the inlet of an electrodialysis cell 5 of the permselective membrane type.

Figure 2:
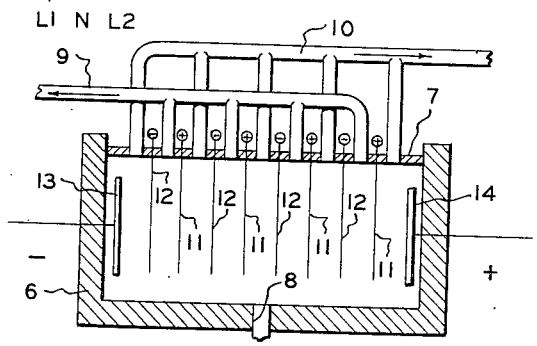
Fig. 2 is a diagrammatic cross-section of the electrodialysis cell forming a part of the system shown in Fig. 1.

As shown in Fig. 2, cell 5 includes an outer wall 6, a top wall 7, a water inlet 8, a demineralized water outlet 9 and a waste discharge outlet 10. Supported inside the cell and dividing it into a plurality of chambers are two sets of alternately spaced permselective ion-exchange membranes or diaphragms, each of the membranes in one set being formed of anion exchange material disposed or supported in a suitable matrix or binder while those of the other set are composed of cation exchange material disposed or supported in a suitable matrix or binder. Referring to Fig. 2, the anion exchange membranes are designated by the numeral 11 while the cation exchange membranes are designated by the numeral 12. A cathode 13 is located in a cathode member at one end of the cell while an anode 14 is located in an anode chamber at the opposite end of the cell. Cell 5 is of course energized by direct current as will be hereinafter explained.

Demineralized water outlet 9 of cell 5 is connected to the lower end of an upwardly extending conduit 15 having heating means, which may be a coiled electric resistance heater 16, in heat transfer relation therewith. Thus a portion of conduit 15 forms a heating chamber 17 from which heated water rises through the section of conduit 15 connected to the upper portion of tank 1. From the description thus far it will be seen that tank 1, cell 5 and heating chamber 17 are connected in a closed fluid flow circuit and are so arranged that water circulation around this path is established whenever a portion of the water in tank 1 is colder than the water in chamber 17. Preferably, flow through the cell and heater is controlled by a temperature responsive valve 18 installed in conduit 15 at the inlet to the upper portion of tank 1, valve 18 being adjusted so as to admit water to the tank only after it has been heated to the desired temperature. Thus if all of the water in tank 1 is initially cold and heater 16 is energized the heated water rising in conduit 15 will establish a thermal convection current which will continue until all of the water in tank 1 has been heated.

Cell 5 functions to reduce the mineral content of water flowing through the chambers communicating with outlet 9 when an electrolytic current is passed through the cell. During energization of cell 5 there occurs a selective migration and segregation of mineral anions and cations to and through the anion and cation exchange membranes respectively, while the water in the chambers communicating with outlet 9 acquires a correspondingly purified condition with respect to its ionizable content. However as a result of this ion migration the water in the chambers communicating with discharge outlet 10 increases in mineral content and to achieve continuous purification it is necessary to continuously withdraw this high mineral content water from the system. Accordingly waste discharge outlet 10 is connected to a waste conduit 19 in which is mounted a constant flow valve 20 and an electrically actuated shut-off valve 21. Valve 20 limits flow through conduit 19 to a relatively low predetermined value and thus maintains a constant discharge of waste water so long as valve 21 is open, regardless of pressure fluctuations in the water supply system to which pipe 2 is connected. To minimize the accumulation of undissolved solid materials on membranes 11 and 12 which may occur in geographical areas having waters containing undissolved solids, a conventional filter device 22 of the type designed to remove such solids may be installed in water inlet line 2.

Referring now to the electrical control system shown in Fig. 1, heating element 16 is connected to a suitable power supply, such as a 230 volt single phase three-wire power source as illustrated. Energization of heater 16 is controlled by a bimetallic thermostat 23 located in the bottom of tank 1 in heat transfer relation with the water in the bottom portion of the tank, and connected so as to operate a relay 24 in the heater circuit. Relay 24 also controls the flow of current to the solenoid of shut-off valve 21, and a rectifier 25 which supplies direct current to cell 5. Thus cell 5, heater 16 and valve 21 are simultaneously energized each time thermostat 23 closes in response to a predetermined low water temperature at the bottom of tank 1.

In describing the operation of the embodiment of my invention described above, it will first be assumed that all of the hot water in tank 1 has been withdrawn and that consequently thermostat 23 has closed, energizing relay 24 which in turn causes the energization of heater 16 and cell 5, and opens valve 21. As the temperature of the water in chamber 17 increases a circulation is established from chamber 17 to the tank, thence to cell 5 and back to chamber 17. Circulation in this manner continues until all of the water in tank 1 is heated to the desired temperature as determined by the setting of thermostat 23. As previously described, all of the cold water which flows from the tank to the heating chamber first passes through cell 5 and more specifically through the alternate chambers communicating with outlet 9. As a result of the migration of ions through membranes 11 and 12 as described above, the mineral content of the water is substantially reduced, and hence the cold hard water leaving the tank through conduit 4 returns to the upper portion of the tank through conduit 15 as hot soft water. It has been determined that the cold hard water in the bottom portion of the tank and the hot soft water in the upper portion thereof remains stratified for a long period of time which is sufficient to assure that only soft water will be withdrawn through outlet conduit 3 during normal operation of the system. During each "on" cycle of the system valve 21 is open and a constant flow of waste water passes through discharge outlet 10 of the cell. However only a small percentage of the water passing through cell 5 need be discharged in this manner to achieve satisfactory demineralizing action.

From the foregoing description it will be seen that my invention provides a combined water heater and softener which may conveniently take the form of a unitary domestic appliance which is relatively simple and fully automatic in operation.

While I have shown and described a specific embodiment of my invention, I do not desire the invention to be limited to the particular construction shown and described and I intend by the appended claim to cover all modifications within the true spirit and scope of my invention.

I claim:

A water heating and treating appliance comprising a storage tank having a water inlet in its bottom portion and a water outlet in its top portion; an electrodialysis cell of the type having a plurality of alternately spaced permselective anion and cation exchange membranes dividing said cell into a plurality of compartments including a cathode compartment and an anode compartment, said cell having a water inlet communicating with all of said compartments, a waste discharge outlet communicating with said anode and cathode compartments and the compartments alternately spaced therefrom, a demineralized water outlet communicating with the remaining of said compartment; said inlet of said cell being connected to the bottom portion of said tank and said water outlet of said cell being connected to the lower end of a heating chamber having an electrical heating element in heat transfer relation therewith, the upper end of said heating chamber being connected by a conduit to the upper portion of said tank, a discharge conduit connected to said discharge outlet of said cell, a constant flow valve and an electrically actuated shut-off valve in said discharge conduit, means for supplying electrical energy to said cell and said heating element including a rectifier for supplying direct current to said cell, and a control system including a thermostat located in the bottom of said tank for simultaneously energizing said heating element, said cell and said shut-off valve when the water temperature in said tank decreases to a predetermined value.

References Cited in the file of this patent

UNITED STATES PATENTS

| | | |
|---|---|---|
| 661,340 | Grever | Nov. 6, 1900 |
| 728,440 | Boucher | May 19, 1903 |
| 2,514,485 | Goff | July 11, 1950 |
| 2,577,694 | Winn | Dec. 4, 1951 |
| 2,681,885 | Briggs | June 22, 1954 |
| 2,689,826 | Kollsman | Sept. 21, 1954 |